(12) United States Patent
Grutze

(10) Patent No.: US 6,685,347 B2
(45) Date of Patent: Feb. 3, 2004

(54) GOBO PROJECTOR FOR A VEHICLE

(76) Inventor: Glen A. Grutze, P.O. Box 2101, Sapulpa, OK (US) 74067

( * ) Notice: Subject to any disclaimer, the term of this patent is extended or adjusted under 35 U.S.C. 154(b) by 0 days.

(21) Appl. No.: 09/964,320

(22) Filed: Sep. 26, 2001

(65) Prior Publication Data

US 2003/0156424 A1 Aug. 21, 2003

(51) Int. Cl.$^7$ .............................. B60Q 1/24; G03B 21/28
(52) U.S. Cl. ...................... 362/487; 362/509; 362/514; 362/546; 353/13
(58) Field of Search ................................ 362/187, 277, 362/282, 284, 293, 294, 319, 322, 324, 495, 509, 514, 521, 546, 496, 487; 353/11–14, 72; 40/541, 556, 560

(56) References Cited

U.S. PATENT DOCUMENTS

| | | | | |
|---|---|---|---|---|
| 1,205,224 A | * | 11/1916 | Koechlein | 362/284 |
| 1,476,149 A | * | 12/1923 | Cohen | 362/282 |
| 1,574,982 A | * | 3/1926 | Lisher | 362/495 |
| 1,736,616 A | * | 11/1929 | Miller | 362/495 |
| 1,810,216 A | * | 6/1931 | Kurtz | 362/495 |
| 2,023,845 A | * | 12/1935 | Larose | 40/556 |
| 2,276,104 A | | 3/1942 | Shaunessey | |
| 3,139,604 A | * | 6/1964 | Meiners et al. | 362/284 |
| 4,136,935 A | * | 1/1979 | Cook et al. | 353/72 |
| 4,174,889 A | * | 11/1979 | Peters | 353/12 |
| 4,312,577 A | * | 1/1982 | Fitzgerald | 353/12 |
| 4,769,743 A | * | 9/1988 | Callahan | 362/284 |
| 4,827,387 A | * | 5/1989 | Ferren et al. | 362/284 |
| 4,843,529 A | * | 6/1989 | Izenour | 362/284 |
| 5,282,121 A | | 1/1994 | Bornhorst et al. | 362/294 |
| 5,519,536 A | * | 5/1996 | Hoehn | 353/13 |
| 5,537,303 A | | 7/1996 | Stacy | 362/284 |
| 5,691,886 A | | 11/1997 | Stacy | 362/283 |
| 5,758,956 A | | 6/1998 | Bornhorst et al. | 362/294 |
| 5,829,868 A | | 11/1998 | Hutton | 362/276 |
| 6,011,640 A | | 1/2000 | Hutton | 359/234 |
| 6,079,136 A | * | 6/2000 | Kozlarek | 40/541 |
| 6,220,737 B1 | | 4/2001 | Baragona | |

FOREIGN PATENT DOCUMENTS

DE          43 24 108 A1      1/1995

* cited by examiner

*Primary Examiner*—Alan Cariaso
(74) *Attorney, Agent, or Firm*—Fellers, Snider, Blankenship, Bailey & Tippens, P.C.

(57) ABSTRACT

A gobo projector for projecting an image onto a paved surface below a vehicle including: a cylindrical body; a light source and reflector at a first end of the body for casting a beam of light toward the opposite end of the body; and a window housing attached to the opposite end of the body. The window housing includes a window opening covered with a transparent material in an airtight manner and a pivotal mirror adapted to reflect the beam of light outward through the window opening. The gobo projector further includes a pair of lenses, interposed between the light source and the mirror, slidably mounted in the housing for adjusting the size and focus of the projected image, a slot for receiving a gobo and a heat shield between the slot and the light source to protect the gobo.

5 Claims, 5 Drawing Sheets

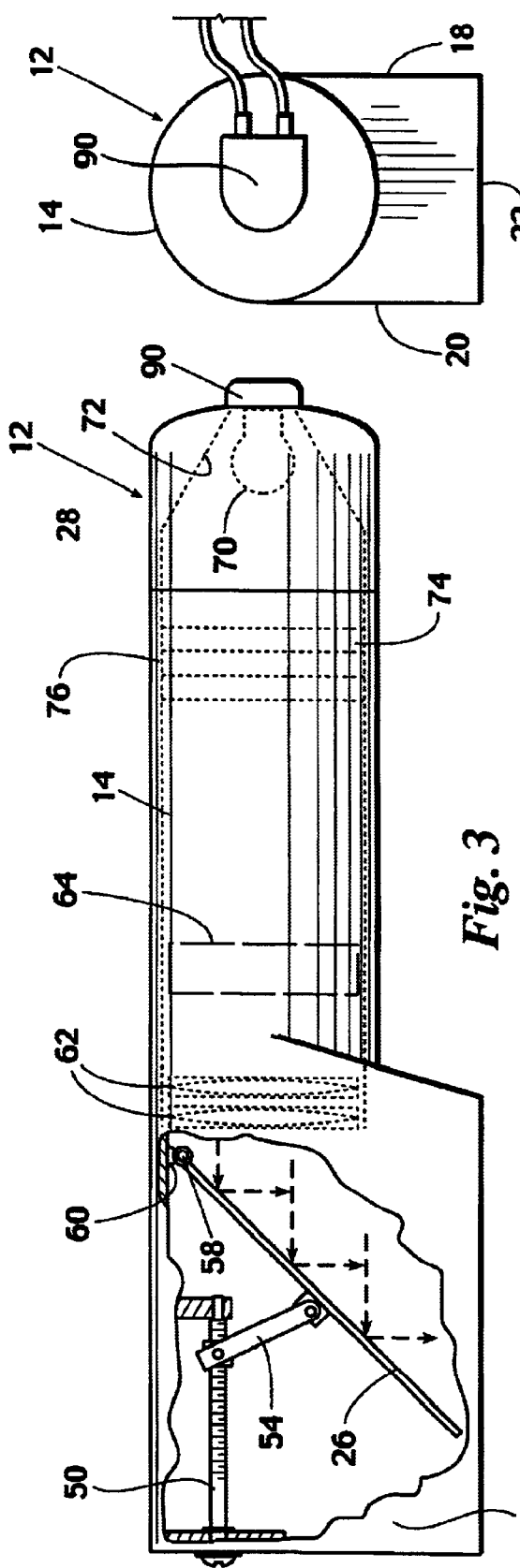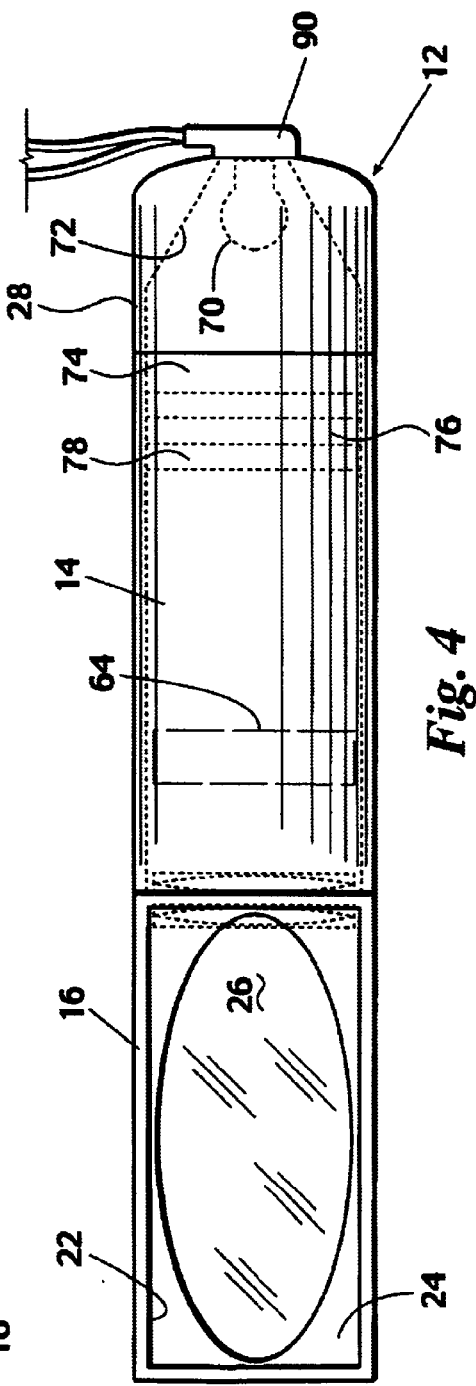

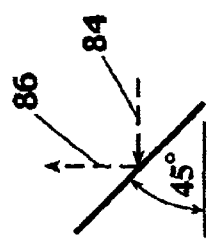
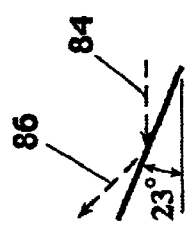
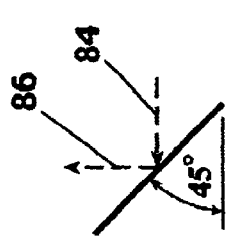
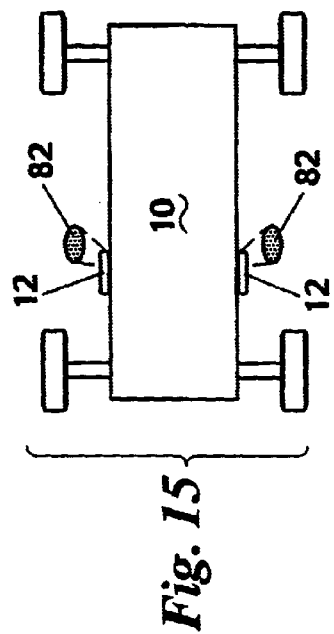
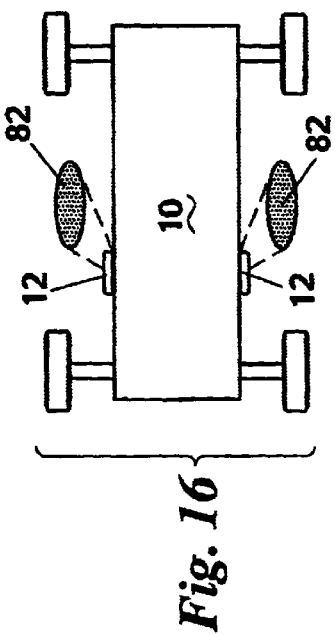
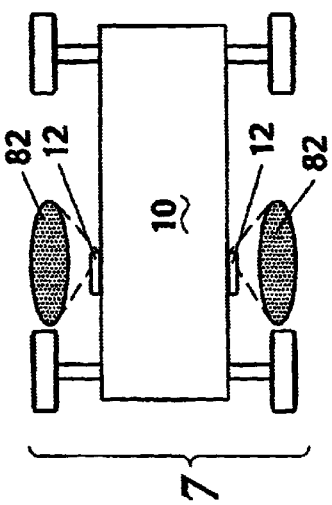
Fig. 15  Fig. 16  Fig. 17
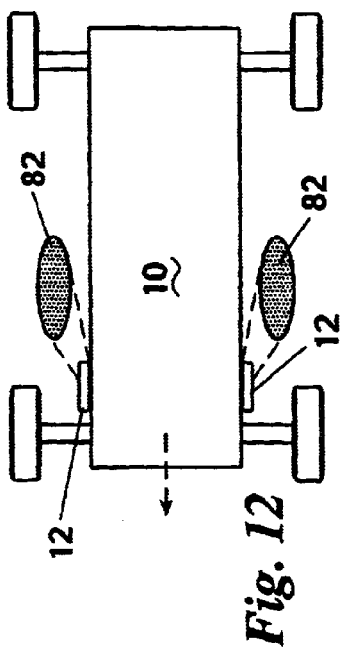
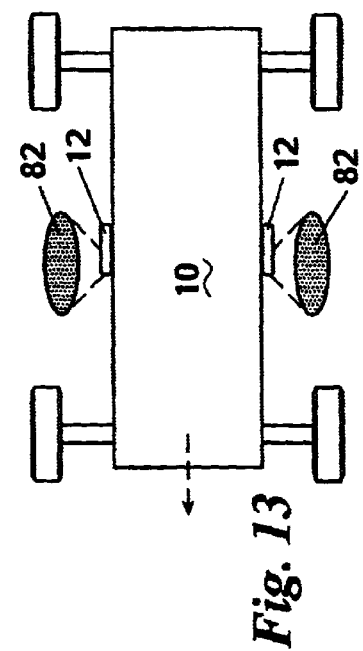
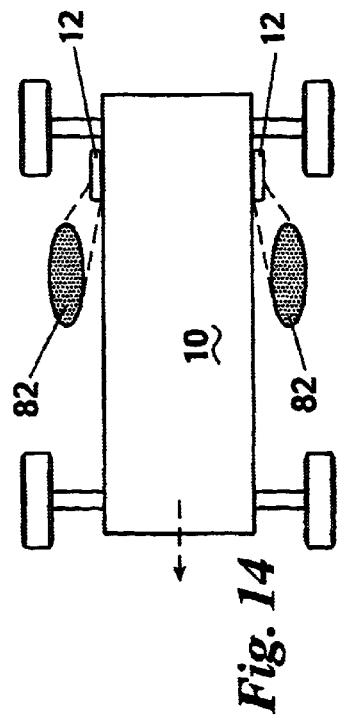
Fig. 12  Fig. 13  Fig. 14

GOBO PROJECTOR FOR A VEHICLE

BACKGROUND OF THE INVENTION

1. Field of the Invention

The present invention relates to a projector which can be attached to a vehicle and more particularly to a gobo disc type projector which can project a preferred logo, such as the logo of an automobile manufacturer onto the pavement beneath the vehicle.

2. Background of the Invention

Gobo projectors are well known in the art. Such projectors find wide use in the entertainment industry, i.e., night clubs, concerts, stage productions, and the like, as well as in displays such as holiday displays. A gobo is essentially a slide (much like a (photographic slide) having a translucent image typically supported in a circular metal frame. Gobos are readily available today on the market for such uses and are often offered with company logos, team logos or images of mascots, school logos, holiday images, patriotic images, artistic images, etc. In addition, manufacturers of gobos will typically produce a custom gobo of virtually any image. None, however, exist of automobile logos.

While portable gobo projectors are also known in the art, none of these projectors are airtight or watertight and adapted for use on a vehicle. A number of factors arise which are unique to such an application. For example: a vehicle mounted gobo projector would preferably be adapted to operate from a 12 volt power supply; it would typically be subjected to inhospitable elements such as rain, snow, salt, rock strikes, road tar, fumes, etc.; and would preferably be of a shape conducive to mounting on a vehicle. In addition, a vehicle mounted gobo projector would have to be positioned such that a projected image would not blind or distract other drivers.

It is thus an object of the present invention to provide a gobo projector for use on a vehicle which satisfies the needs and alleviates the problems discussed above.

SUMMARY OF THE INVENTION

The present invention relates to a projector utilizing conventional lenses and one or more gobo discs all mounted in an airtight easily movable container or projector which is adapted to project an image onto the surface of the pavement adjacent or beneath an automobile, or other vehicle, preferably in the areas adjacent the driver's door and the passenger's door.

The projector of the present invention consists essentially of a cylindrical body approximately 10 inches long and approximately 2 inches in diameter. These dimensions are given merely for convenience and are not to be considered as critical. At the forward end of the cylindrical body is mounted a window housing which includes a pair of parallel side plates projecting downwardly tangent to the cylindrical body and terminating in a window which faces down towards the pavement. Inside the window housing is a pivotal mirror which is adjustable as to its angle. Also within the window housing are a pair of lenses which are adapted to be moved, in a conventional manner, along a track arrangement to a given position towards the opposite end of the cylindrical body.

At the opposite end of the cylindrical body is a light source and a conical reflector to direct the light beams toward the forward end of the device. In the cylindrical housing between the light source and the lenses are a heat shield and immediately forward of that a slot for a gobo disc and immediately forward of the slot for the gobo disc an optional slot for an optional gobo disc.

The above described cylinder with adjustable mirror, gobo discs, heat shield, and light source is removably mounted on a bracket which can be pre-punched with holes so as to permit attachment of the bracket to the under surface of the automobile at any convenient location by means of a rivet gun, threaded fasteners, or other suitable means. A glass or plastic window covers the window opening in the window portion of the projector in an airtight and liquid tight relation. In fact, the entire projector is liquid tight and airtight. The bulb and the conical reflector are mounted in a cap which screws over the end of the cylindrical body and which is secured thereto by means of an o-ring which makes the connection liquid tight. The projector connects with the conventional 12 volt system of the vehicle through a connector which is also water tight.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 3 is a side elevation similar to FIG. 2 but on a slightly larger scale, showing some of the internal details of the device.

FIG. 4 is a bottom view taken from FIG. 3.

FIG. 5 is a right-hand end view taken from FIG. 3.

FIGS. 12 through 17, inclusive, are semi-diagrammatic views similar to FIG. 6 but showing the projectors and their images in somewhat different relative positions along the horizontal length of the vehicle.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
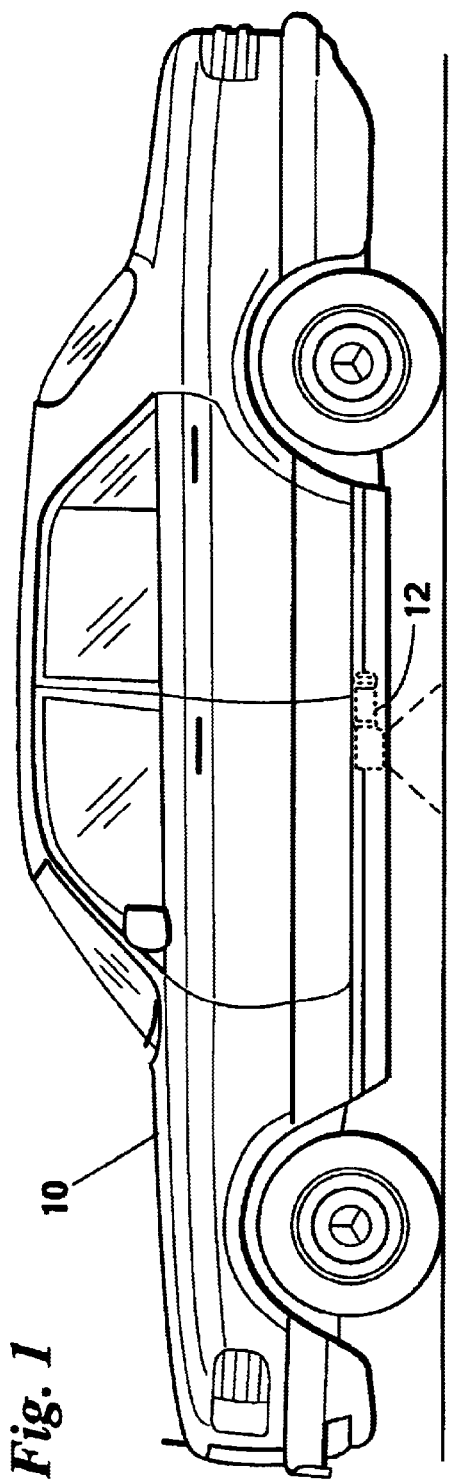
FIG. 1 is a side elevation of a vehicle to which the projector of the present invention is attached.
Figure 2:
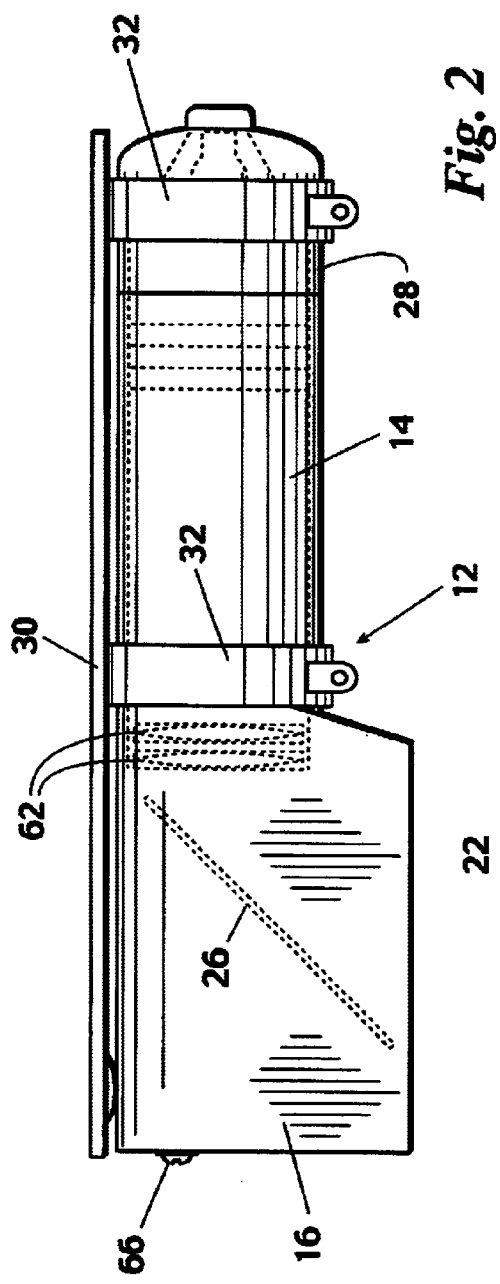
FIG. 2 is a side elevation of one of the projectors itself on a larger scale than is shown in FIG. 1.

Referring to the drawings in detail, FIG. 1 shows a vehicle 10 to which the projector of the present invention is applied. As best shown in FIG. 2, the projector 12 is comprised of a cylindrical body 14 approximately 10 inches in length and about 2 inches in diameter, preferably formed of plastic, or other moldable material. This body 14 is airtight and watertight and is provided with an end cap 28 which seals over the right-hand end of the cylindrical body 14 as shown in FIG. 2, but which includes the light bulb and its reflector, as will be described hereinafter. Forward of the cylindrical portion 14 is a window housing 16 which, as best shown in FIG. 5, consists of a pair of parallel side plates 18 and 20 which extend tangent to the cylindrical body and which extend further about one inch below the cylindrical body.

Figure 7:
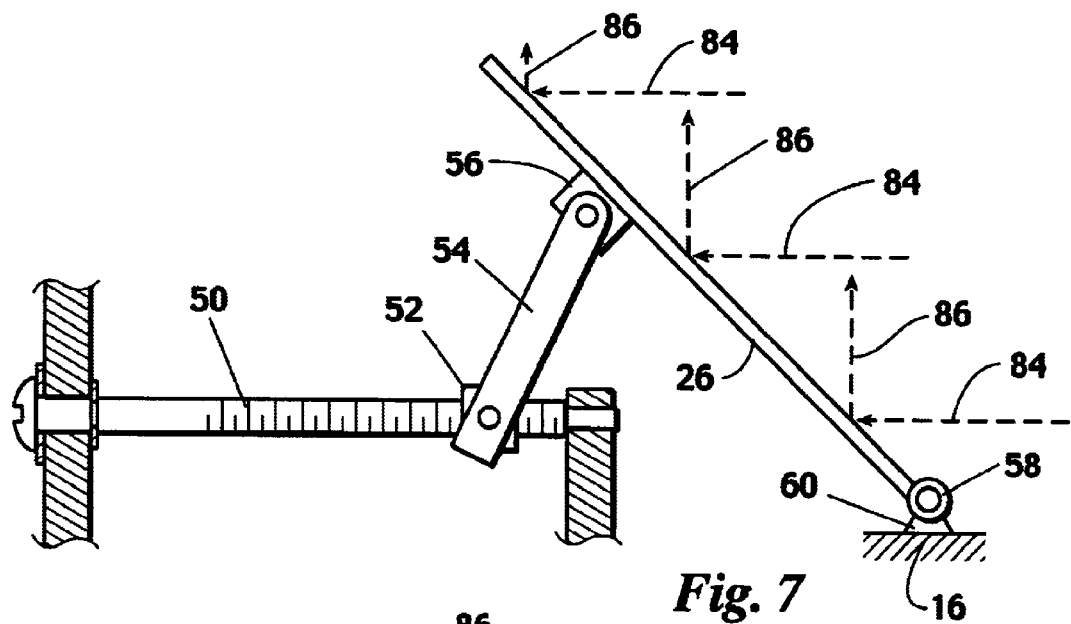
FIG. 7 is an internal detail of the mirror shown in FIG. 3 but rotated 180°.
Figure 8:
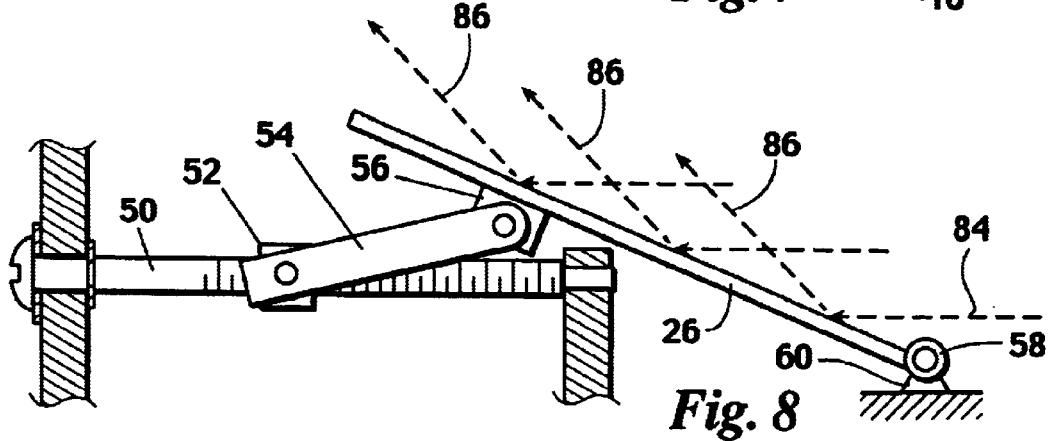
FIG. 8 is a view similar to FIG. 7 but showing the mirror being retracted to a more acute angle.

Referring to FIG. 4, the window housing 16 terminates in a window opening 22. Preferably a glass or plastic material 24 covers the window 22 in an airtight relation. Within the window housing 16, there is mounted an oval mirror 26, preferably of plastic material, which is pivotally mounted at its upper end 58 to a pivotal ear 60 as shown in FIG. 3. As shown in FIGS. 7 and 8, which represent the same element shown in FIG. 3 rotated 180°, the upper end 58 of the mirror 26 becomes the lower end in FIG. 7 and the ear 60 is shown as attached to the upper body of the window housing 16. Continuing on with a consideration of FIGS. 7 and 8, the mirror is actuated by a worm screw 50 which projects outwardly from the window housing 16 and which engages a worm nut 52 which is pivotally secured to the lower end of a lever arm 54. The upper end of the lever arm 54 (actually this would be the lower end as shown in FIG. 3) attaches to a tab 56 which is secured to the non-reflective side of the mirror 26. As can be appreciated from a consideration of FIGS. 7 and 8, turning the worm screw 50 would cause the mirror 26 to pivot about the ear 60 so as to change from a large acute angle in FIG. 7 to a small acute angle in FIG. 8.

Figure 11:
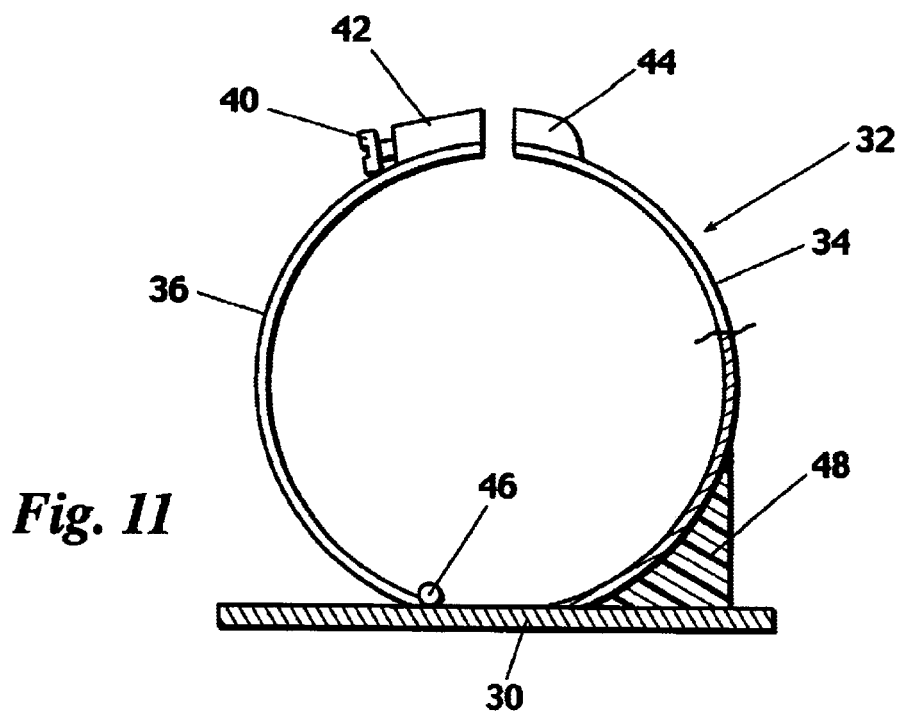
FIG. 11 is an enlarged partial sectional view of the clamp which is used to hold the projector against the bracket of FIG. 9, taken along line 11—11 of FIG. 9.
Figure 9:
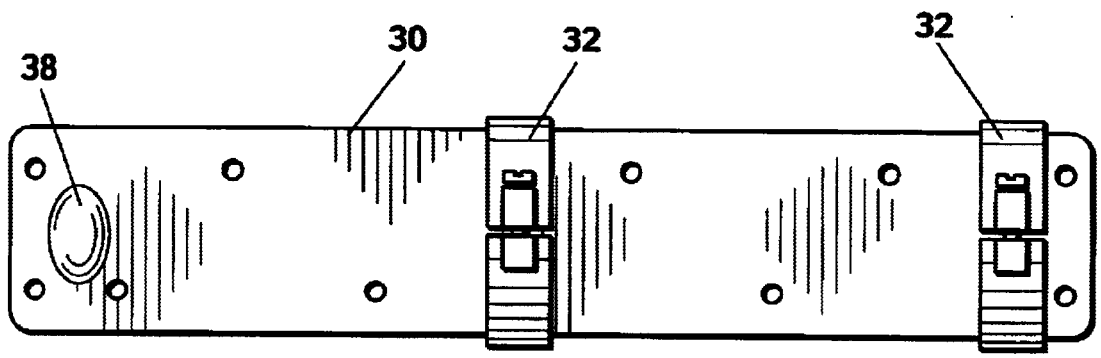
FIG. 9 is a bottom plan view of the bracket which is used for holding the projector and for attaching it to the vehicle.
Figure 10:
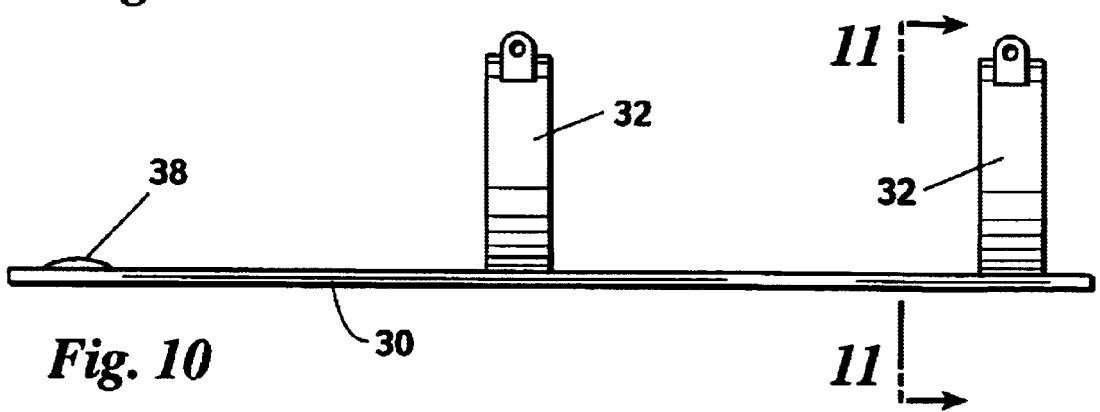
FIG. 10 is a side elevation taken from FIG. 9.

As shown in FIGS. 9 to 11, the projector 12 is preferably attached to the underside of a vehicle 10 (not shown here) by means of a bracket 30 which is provided with a plurality of pre-punched holes. A rivet gun (not shown) can be used to attach the bracket to the underside of the automobile through the pre-punched holes in any convenient manner and at a location which is convenient to the operator. As will be apparent to those skilled in the art, a variety of other means could alternatively be employed for securing bracket 30 to the vehicle 10 including, but not limited to, threaded fasteners, adhesives, straps, etc. The bracket 30 consists of a rectangular plate approximately 10 inches in length and 2 inches in width having a pair of circular clamps 32 attached thereto, one clamp 32 being at one end of the bracket and the other clamp 32 being essentially centrally located. At the opposite end of the bracket 30 from the clamp 32 is a rounded enlargement 38 which will bear against the projector 12 when it is mounted on the plate 30 so as to minimize vibration.

Referring now particularly to FIG. 11, each clamp 32 is comprised of a semi-circular stationary portion 34 and a pivotal semi-circular portion 36 the lower end of which is pivotally attached to the bracket by means of the pivot joint 46. The upper ends of the clamp are placed together by an adaptor which consists of a screw 40 mounted in a screw housing 42 and cooperating with a threaded coupler 44 at the upper end of the stationary portion 34 of the clamp.

Turning again to FIGS. 3 and 4, the projector 12 of the present invention is provided with a pair of movable lenses 62 which are adapted to be moved lengthwise of the barrel of the cylindrical body 14. The dotted line position 64 represents the possible maximum movement of the lenses 62 towards the right-hand end of the cylindrical body 14. As shown in FIG. 2, the lenses 62 are adapted to slide in a track and are movable by means of the adjustment screw 66 in a conventional manner, the details of which are not shown.

As will be apparent to those skilled in the art, the lense system employed in the inventive gobo projector, and described above, is typical of prior art gobo projectors. It should be noted that a variety of conventional lense systems could instead be employed, the main concerns being the ability to focus the projected image and protection of the lenses from the environment.

Figure 6:
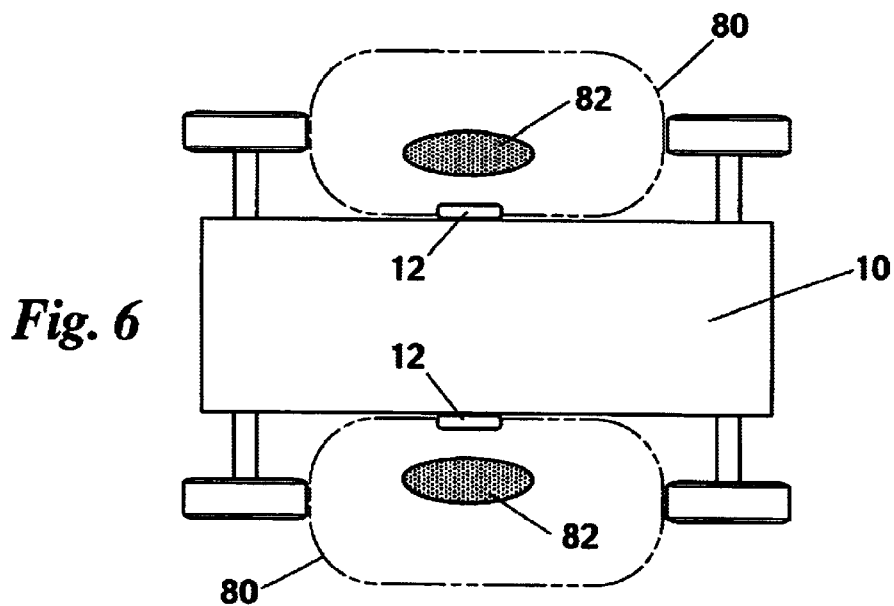
FIG. 6 is a semi-diagrammatic plan view of the vehicle shown in FIG. 1 showing two projectors, one on each side, and the area in which the image can be projected.

When projectors 12 of the present invention are installed on a vehicle, preferably one projector is attached to each side of the automobile. Preferably, also, the two projectors are installed under the driver door and the passenger door, respectively, so as to project images on the pavement or roadway. The maximum area, or projection area, is represented by the numeral 80 in FIG. 6. As shown in FIGS. 3 and 4, the light source is a bulb 70, which is surrounded by a reflective cone 72. The light from the bulb 70 passes through a clear type heat shield 74 through a gobo disc mounted in slot 76 and, if desired, through a clear gobo disc mounted in extra slot 78. The light from the gobo discs passes through the lens 62 to the mirror and then out through the window 24.

As shown in FIG. 7, if the light 84 coming horizontally from the light source strikes the mirror 26 at approximately a 45 degree angle, the reflective light 86 will be at right angles to the incoming light 84. However, if the mirror 26 is at an acute angle as shown in FIG. 8, the reflected beams of light 86 will be at an obtuse angle with respect to the incoming horizontal rays of light from the light source.

Turning now to a consideration of FIGS. 12 through 17 inclusive, if the projectors 12 are located in a forward portion of the vehicle, it will be necessary to have the light beams reflect the images 82 back from the projectors 12, in which case the angle of the mirrors shown in FIG. 8 would be adjusted. If the two projectors 12 are substantially centrally located on the vehicle, the mirror can be essentially in the position shown in FIG. 7. When the projectors 12 are located at the rear of the vehicle, then the mirrors would be adjusted opposite to that shown in FIG. 12.

FIG. 15 shows the two projectors 12 located forward of the center of the vehicle and with the images 82 being smaller. This is effected by changing the position of the lenses. FIG. 16 shows the projectors in essentially the same position as in FIG. 15, but with the images 82 being slightly larger. This can be effected by adjusting the lenses and the angle of the mirror. In FIG. 17, the images 82 are slightly larger than those shown in FIG. 16 and, again, this condition is created by adjusting the lenses and the mirror.

Preferably, the lenses 62 are three to four inches from the gobo disc 76 and are adjustable in that area.

It should be noted too that, with vehicles with exceptionally high ground clearance, it may be desirable to use a single projector to project an image directly under the vehicle.

For the purpose of providing stability and for eliminating some of the vibration, a solid plastic filet 48 is placed between the stationary portion 34 of the coupler 32 and the bracket 30 as shown in FIG. 11.

It should be understood that the end cap 28 which is screwed onto the cylindrical body 14 can be unthreaded and removed so as to replace the gobo disc. However, the cap 28 is attached to the cylindrical disc 14 by means of an O-ring connection (not shown) to assure fluid tightness.

It should be emphasized that the device is airtight and watertight and is preferably made of shatterproof scratch resistant glass and/or plastic where such portions are employed. The device is adapted to be utilized with the 12-volt electrical supply system of the automobile. The light bulb should be long lasting and preferably low heat. As shown in FIG. 5, the light bulb is connected to the 12-volt system by means of a power plug 90 which is also watertight. With the device of the present invention, the light is never seen, only the image, which is thrown onto the pavement. By twisting and turning the unit and by moving the mirror, one could put the image 82 any place within the image area 80. However, the best and most desired location for the image should be under the driver and under the passenger door, filling an area approximately 12 inches by 24 inches.

It is understood that some vehicles have their chassis lower than others. It has been found, as far as the present invention is concerned, that as the apparatus moves away from the ground, from 12 inches to 24 inches, the adjustment distance from the gobo disc to the lens assembly is a mere 2 inches, thus making clear focus and clarity a very minimal problem.

As will be apparent to those skilled in the art, while various components of the inventive gobo projector were described as being formed of plastic, a number of other materials would perform satisfactorily and the use of such materials is within the scope and spirit of the present invention. By way of example and not limitation, cylindrical body 14 could be formed of metal, wood, or other rigid material.

As will also be apparent to those skilled in the art, while the inventive gobo projector is shown and described as mounting to a vehicle with a bracket having band-type clamps thereon, the method of mounting the projector is not so limited. In fact, the projector itself could be attached directly to the vehicle, if so desired.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A gobo projector accessory for a vehicle, for projecting an image stored on a gobo from the vehicle onto a portion of a surface below the vehicle, comprising a cylindrical body having a light source at one end and a reflector for directing light towards an opposite end of the cynical body, a window housing located at the opposite end of the cylindrical body, the window housing compromising a pair of parallel plates connected tangentially to the sides of the cylindrical body and extending downwardly in parallel relation and terminating in a window opening, a window covering the window opening in an airtight manner, a pivotal mirror located in the window housing and adapted to intercept light beams from the light source and direct them downwardly through the window, a pair of lenses interposed between the mirror and the light source, a transparent heat shield located in the cylindrical body adjacent the light source, a slotted opening in said cylindrical body for receiving therein a gobo disc adjacent the heat shield and a flat bracket have pre-punched holes to permit attachment thereof to the underside of the vehicle, a first clamp mounted at an end of the bracket and second clamp mounted intermediate the ends of the bracket, the clamps being adapted to engage the cylindrical body of the projector and hold it against the bracket, a protuberance located adjacent at an end of the bracket opposite from the end at which the first clamp is attached forbearing against the projector to minimize vibration thereof.

2. A gobo projector as set forth in claim 1 including means for adjusting the angle of the mirror comprising an elongated worm screw mounted for rotation within the window housing, a worm nut operatively engaging the worm screw, a pivotal arm having one end attached to the worm nut and another end attached to a tab connected to the underside of the mirror whereby rotation of the worm screw will cause movement of the worm and consequent pivotal movement of the mirror.

3. A gobo projector as set forth in claim 1 wherein said pair of lenses is movable between a first position toward said light source and a second position away from said light source for focusing the projected image on the surface below the vehicle, the gobo projector fiber comprising a focus adjustment screw for selectively moving said pair of lenses between said first position and said second position.

4. A gobo projector as set forth in claim 3 including a plastic fillet located between a side of the first clamp and the bracket to dampen vibrations of the projector.

5. A gobo projector accessory for a vehicle having a frame beneath the vehicle, the gobo projector comprising:

a body having a first end arid a second end, said body including a mounting bracket affixed to the frame of the vehicle;

a gobo having an image stored thereon, said gobo disposed in said body between said first end and said second end;

a lens disposed between said first end and said second end;

a window located proximate said second end, said window comprising an aperture in said body and a transparent cover covering said aperture in an airtight manner, and a light source at said first end directing light through said gobo and said lens towards said second end such that said image is projected from beneath the vehicle.

* * * * *